United States Patent
Minato

(10) Patent No.: US 9,239,120 B2
(45) Date of Patent: Jan. 19, 2016

(54) PROTECTION VALVE
(75) Inventor: Ichirou Minato, Tokyo (JP)
(73) Assignee: NABTESCO AUTOMOTIVE CORPORATION, Tokyo (JP)
( * ) Notice: Subject to any disclaimer, the term of this patent is extended or adjusted under 35 U.S.C. 154(b) by 339 days.
(21) Appl. No.: 13/984,474
(22) PCT Filed: Feb. 9, 2012
(86) PCT No.: PCT/JP2012/052971
§ 371 (c)(1), (2), (4) Date: Oct. 8, 2013
(87) PCT Pub. No.: WO2012/108501
PCT Pub. Date: Aug. 16, 2012

(65) Prior Publication Data
US 2014/0020778 A1  Jan. 23, 2014

(30) Foreign Application Priority Data
Feb. 10, 2011 (JP) ................................ 2011-027257
May 26, 2011 (JP) ................................ 2011-117872

(51) Int. Cl.
*F16K 11/074* (2006.01)
*F15C 3/00* (2006.01)
(Continued)
(52) U.S. Cl.
CPC ............ *F16K 17/02* (2013.01); *B60G 17/0523* (2013.01); *B60T 11/32* (2013.01);
(Continued)
(58) Field of Classification Search
CPC . B60T 11/326; B60G 17/0523; F16K 11/105; F16K 17/003; F16K 17/0473; F16K 17/048; F16K 17/06; F16K 31/1225; F16K 31/1268; F16K 31/383; F16K 31/385; Y10T 137/7838; Y10T 137/2663; Y10T 137/8733; Y10T 137/87877; F15B 13/02; F15B 13/50527

USPC ............ 137/12, 84, 492.5, 512, 487, 625.12, 137/885; 303/7, 8, 122.15, 9.76, 118.1, 303/122.09, 127, 128, 9.66, 9.74, 9.75
See application file for complete search history.

(56) References Cited

U.S. PATENT DOCUMENTS 4,697,852 A * 10/1987 Scholz .................. B60T 13/683
188/106 R
6,089,831 A * 7/2000 Bruehmann ....... B60G 17/0523
303/3
(Continued)

FOREIGN PATENT DOCUMENTS

DE  3434884 A  4/1986
EP  0574674 A  12/1993
(Continued)

OTHER PUBLICATIONS

International Search Report mailed May 1, 2012 for the corresponding PCT Application No. PCT/JP2012/052971.
(Continued)

*Primary Examiner* — John Fox
*Assistant Examiner* — Hailey K Do
(74) *Attorney, Agent, or Firm* — Leason Ellis LLP.

(57) ABSTRACT

A protection valve includes: an input chamber into which air is introduced; a plurality of output ports through which air is discharged; and safety valves which open in response to a pressure increase on a primary side or close in response to a pressure decrease on a secondary side, the safety valves including a safety valve PV21 and a safety valve PV23. An air flow path from the input chamber is branched into a first branch line and a second branch line, and a time lag-creating valve having an opening pressure higher than the safety valve PV21 is provided at a upstream of the safety valve PV23 in the second branch line, so that the safety valve PV23 can open with a time lag after the safety valve PV21 opens, regardless of the difference between the opening pressures of the safety valves PV21 and PV23.

2 Claims, 15 Drawing Sheets

(51) Int. Cl.
*F16K 17/00* (2006.01)
*G05D 16/10* (2006.01)
*F16K 17/02* (2006.01)
*B60G 17/052* (2006.01)
*B60T 13/26* (2006.01)
*B60T 15/48* (2006.01)
*B60T 11/32* (2006.01)
*B60T 13/10* (2006.01)
*B60T 15/36* (2006.01)
*B60T 17/04* (2006.01)
*B60T 17/18* (2006.01)
*F16K 31/122* (2006.01)

(52) U.S. Cl.
CPC .............. *B60T 13/10* (2013.01); *B60T 13/265* (2013.01); *B60T 15/36* (2013.01); *B60T 15/48* (2013.01); *B60T 17/04* (2013.01); *B60T 17/18* (2013.01); *F16K 31/1225* (2013.01); *Y10T 137/2663* (2015.04); *Y10T 137/87829* (2015.04)

(56) References Cited

U.S. PATENT DOCUMENTS

2006/0244305 A1* 11/2006 Hilberer .................. B60T 13/38
                                                                    303/15

2010/0139786 A1    6/2010  Minato et al.

FOREIGN PATENT DOCUMENTS

| EP | 0642962 A | 3/1995 |
|----|-----------|--------|
| EP | 0717201 A | 6/1996 |
| FR | 2172179 A | 9/1973 |
| FR | 2332894 A | 6/1977 |
| FR | 2466376 A | 4/1981 |
| GB | 1208932 A | 10/1970 |
| JP | 10-100888 A | 4/1998 |
| JP | 2000-043710 A | 2/2000 |
| JP | 2005-127477 A | 5/2005 |
| JP | 2006-168393 A | 6/2006 |
| JP | 2007-285518 A | 11/2007 |
| JP | 2008-137480 A | 6/2008 |
| JP | 2010-221179 A | 10/2010 |
| TW | I238793 B | 9/2005 |

OTHER PUBLICATIONS

European Search Report mailed Jun. 23, 2014 for the corresponding European Application No. 12744469.3.

* cited by examiner

PROTECTION VALVE

CROSS-REFERENCE TO RELATED PATENT APPLICATIONS

This application is a U.S. National Phase application under 35 U.S.C. §371 of International Patent Application No. PCT/JP2012/052971, filed Feb. 9, 2012, and claims the benefit of Japanese Patent Applications No. 2011-027257, filed on Feb. 10, 2011 and No. 2011-117872, filed May 26, 2011, all of which are incorporated by reference in their entirety herein. The International application was published in Japanese on Aug. 16, 2012 as International Publication No. WO/2012/108501 under PCT Article 21(2).

FIELD OF THE INVENTION

The present invention relates to a protection valve for use in a brake system of a vehicle and the like.

BACKGROUND OF THE INVENTION

In a vehicle in which air pressure is used to operate a service brake, parking brake, clutch, suspension, or another auxiliary machine, a protection valve as disclosed in any of Patent Literatures 1 to 5 is used in order to enhance the reliability of the air system.

The conventional protection valves all include an input port for compressed air, output ports from which air is discharged, and safety valves corresponding to the output ports. The circuit configuration of a conventional protection valve is described below with reference to FIG. 13. FIG. 13 is a circuit diagram of a protection valve (which is hereinafter referred to simply as "valve") 110 disclosed in Patent Literature 1.

In FIG. 13, the valve 110 includes an inlet 111 connected to a pressure source, an outlet 113 connected to a first main brake circuit 112, an outlet 115 connected to a second main brake circuit 114, an outlet 117 connected to a spring brake circuit 116, and an outlet 119 connected to an auxiliary machine circuit 118.

A first valve 120 is provided between the inlet 111 and the outlet 113. Similarly, a second valve 121 is provided between the inlet 111 and the outlet 115, a third valve 122 is provided between the secondary side (outlet) of the first valve 120 and the outlet 117, and a fourth valve 123 is provided between the secondary side (outlet) of the second valve 121 and the outlet 119. Check valves 132 and 133, which permit a flow only from an inlet to an outlet, are provided in the middle of the connection passages 130 and 131 connecting the third valve 122 and the fourth valve 123 to the first valve 120 and the second valve 121, respectively.

The valve 110 is provided with a first bypass line bypassing the first valve 120, and the first bypass line is provided with a check valve 125 which permits a flow only from an inlet to an outlet and a throttle valve 126. Similarly, the valve 110 is provided with a second bypass line bypassing the second valve 121, and the second bypass line is provided with a check valve 128 which permits a flow only from an inlet to an outlet and a throttle valve 129.

The inlet 111 and the outlet 117 for the spring brake circuit is communicated with each other via a passage 134, and a check valve 135 which permits a flow only from the outlet 117 for the spring brake circuit to the inlet 111 and a throttle valve 136 are provided in the passage 134.

According to the valve 110, if the first main brake circuit 112 fails and air leaks therefrom when the vehicle is left undriven for a whole day and night, for example, the air reserved in the air tank of the spring brake circuit 116 reaches the inlet 111 via the check valve 135 and the throttle valve 136 in the passage 134. The air is then discharged from the failed first main brake circuit 112 via the first throttle valve 126, the check valve 125, and the outlet 113.

In this case, the pressure in the spring brake circuit 116 becomes too low to supply air necessary to release the spring brake to the air chamber of the spring brake device. As a result, the vehicle cannot be started even when the driver performs a spring brake releasing operation. Accordingly, a safety problem can be eliminated because the spring brake cannot be released until the second main brake circuit 114 becomes functional after the start of the engine (start of the pressure source).

RELATED ART DOCUMENT

Patent Literature

[Patent Literature 1] JP Hei 10.100888 A
[Patent Literature 2] JP 2005-127477 A
[Patent Literature 3] JP 2006-168393 A
[Patent Literature 4] JP 2007-285518 A
[Patent Literature 5] JP 2008-137480 A

Problem to be Solved by the Invention

In the above protection valve disclosed in Patent Literature 1 (and in the protection valves disclosed in Patent Literatures 2 to 5 as well), the third valve 122 is connected to a downstream side of the first valve 120. In other words, the first valve 120 and the third valve 122 are connected in series. Similarly, the fourth valve 123 is connected to a downstream side of the second valve 121. In other words, the second valve 121 and the fourth valve 123 are connected in series.

This is based on a specification requirement for a vehicle requiring that valve opening action in the vehicle should be done in regular sequence. In other words, in a vehicle, the third valve 122 should not open (the spring brake circuit 116 should not become releasable) before the first valve 120 (before the first main brake circuit 112 becomes useable). This requirement is also true between the fourth valve 123 and the second valve 121.

A conventional protection valve has a circuit configuration as described above. However, as disclosed in Patent Documents 2, 3, 5, some protection valves have a generally L-shaped base (body) with openings in its surfaces, and valves are disposed in the openings. Also, the protection valve disclosed in Patent Document 4 has a generally rectangular parallelepiped base with openings in its surfaces, and the valves and major components are disposed in the openings.

However, the conventional configuration, in which two safety valves are connected in series to provide a regular sequence of valve opening, tends to complicate the flow paths in the base of the protection valve and, in particular, tends to increase the thickness of the base. On the other hand, a thinner protection valve is required depending on the vehicle specification. That is, there have been hopes for development of a thinner protection valve that keeps a regular sequence of valve opening as in a conventional protection valve.

SUMMARY OF THE INVENTION

The present invention has been made in view of the above circumstances, and it is, therefore, an object of the present invention to provide a thinner protection valve with a regular sequence of valve opening.

Means for Solving the Problem

For the purpose of accomplishing the above object, a first aspect of the present invention is a protection valve, including:

an input chamber into which air is introduced;

a plurality of output ports through which air is discharged; and safety valves which open in response to a pressure increase on a primary side or close in response to a pressure decrease on a secondary side, the safety valves including a first safety valve provided corresponding to a first output port in the plurality of output ports and a second safety valve provided corresponding to a second output port in the plurality of output ports;

in which an air flow path from the input chamber is branched at least into a first branch line leading to the first output port and into a second branch line leading to the second output port, and in which a time lag-creating valve having an opening pressure higher than an opening pressure of the first safety valve is provided at a upstream side of the second safety valve in the second branch line, so that the second safety valve can open with a time lag after the first safety valve opens, regardless of a difference between the opening pressure of the first safety valve and the opening pressure of the second safety valve.

According to this aspect, the regular sequence of opening first and second valves is realized not by connecting the first and second safety valves in series but by arranging the first and second safety valves in parallel and disposing a time lag-creating valve having an opening pressure higher than that of the first safety valve at the upstream side of the second safety valve. Therefore, the structure in the valve body of the protection valve is prevented from becoming complicated. In addition, because the only thing to do about the time lag-creating valve is to control the opening pressure strictly, the degree of freedom for design of the valve body of the protection valve is higher than those protection valves with a circuit configuration in which the safety valves are connected in series.

A second aspect of the present invention is the protection valve according to the first aspect, in which the second branch line is branched at least into a third branch line leading to the second output port and into a fourth branch line leading to a third output port in the plurality of output ports at the upstream side of the second safety valve, in which a third safety valve which opens in response to a pressure increase on the primary side and closes in response to a pressure decrease on the secondary side is provided corresponding to the third output port in the fourth branch line, in which in the valve body of the protection valve, each of the second safety valve and the third safety valve includes: a partition wall which is formed around an axis parallel to a first axis of an orthogonal coordinate system having first, second, and third axes and which separates a secondary side space extending in the direction of the first axis from a primary side space formed around the secondary side space; and a valve element movable in the direction of the first axis from an end of the partition wall which serves as a valve seat to open or close communication between the primary side space and the secondary side space, in which the time lag-creating valve includes: a partition wall which is formed around an axis parallel to the second axis and which separates a primary side space extending in the direction of the second axis from a secondary side space formed around the primary side space; and a valve element movable in the direction of the second axis from and end of the partition wall which serves as a valve seat to open or close the communication between the primary side space and the secondary side space, in which the second safety valve and the third safety valve are located at a prescribed distance from each other in the direction of the third axis, and in which the time lag-creating valve is located between the second safety valve and the third safety valve in the direction of the third axis so that the secondary side space of the time lag-creating valve can be located adjacent to and communicated with the primary side spaces of the second safety valve and the third safety valve.

According to this aspect, the valve body of the protection valve can be prevented from increasing a thickness (thickness in the direction of the second axis) even when the time lag-creating valve is installed. The reason is described in detail later.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Embodiment for Carrying Out the Invention

Description is hereinafter made of an embodiment of the present invention with reference to the drawings. An embodiment is described below on the premise that the embodiment described below is merely one embodiment of the present invention and is not intended to limit the present invention.

Figure 1:
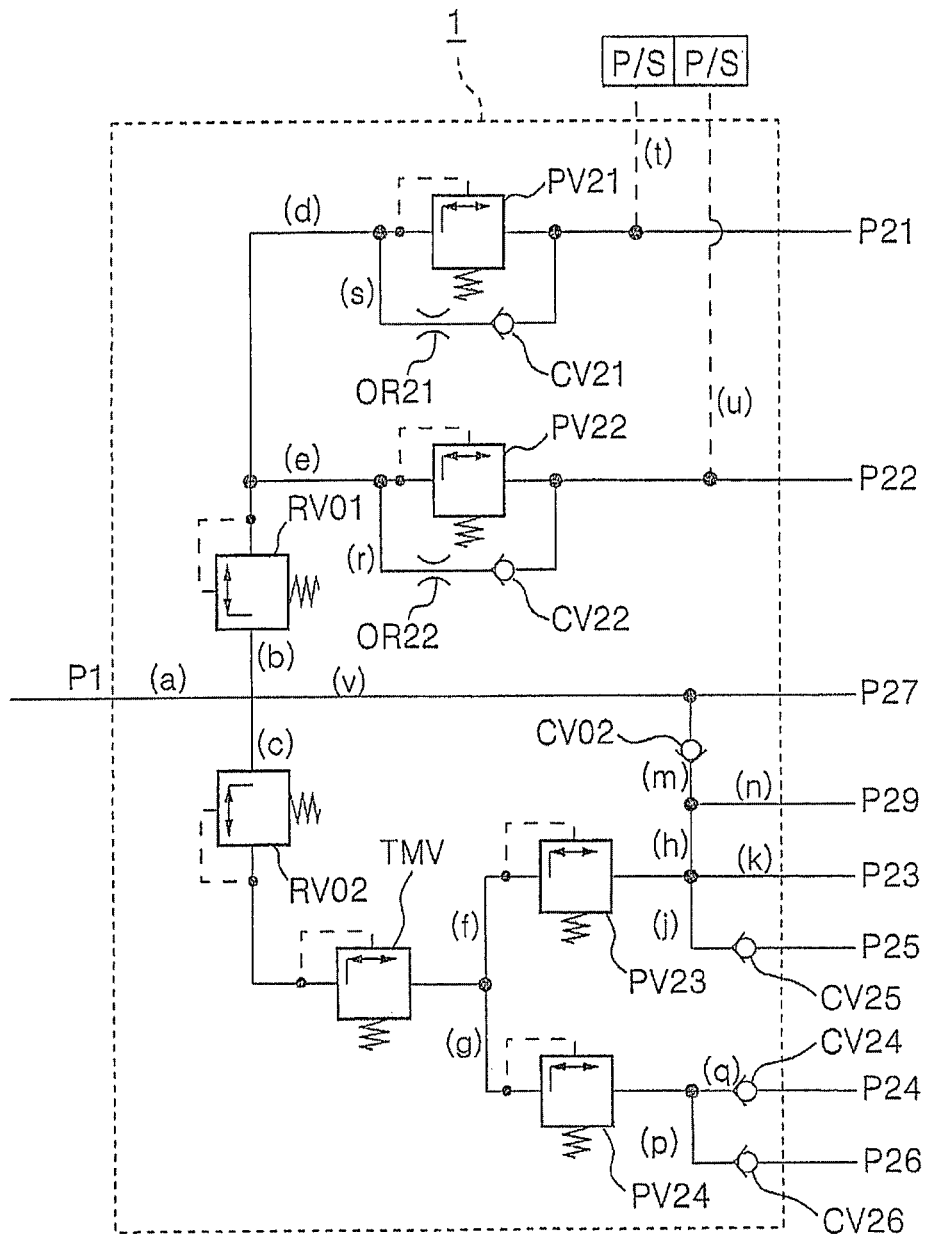
FIG. 1 is a circuit diagram of a protection valve according to the present invention.
Figure 2:
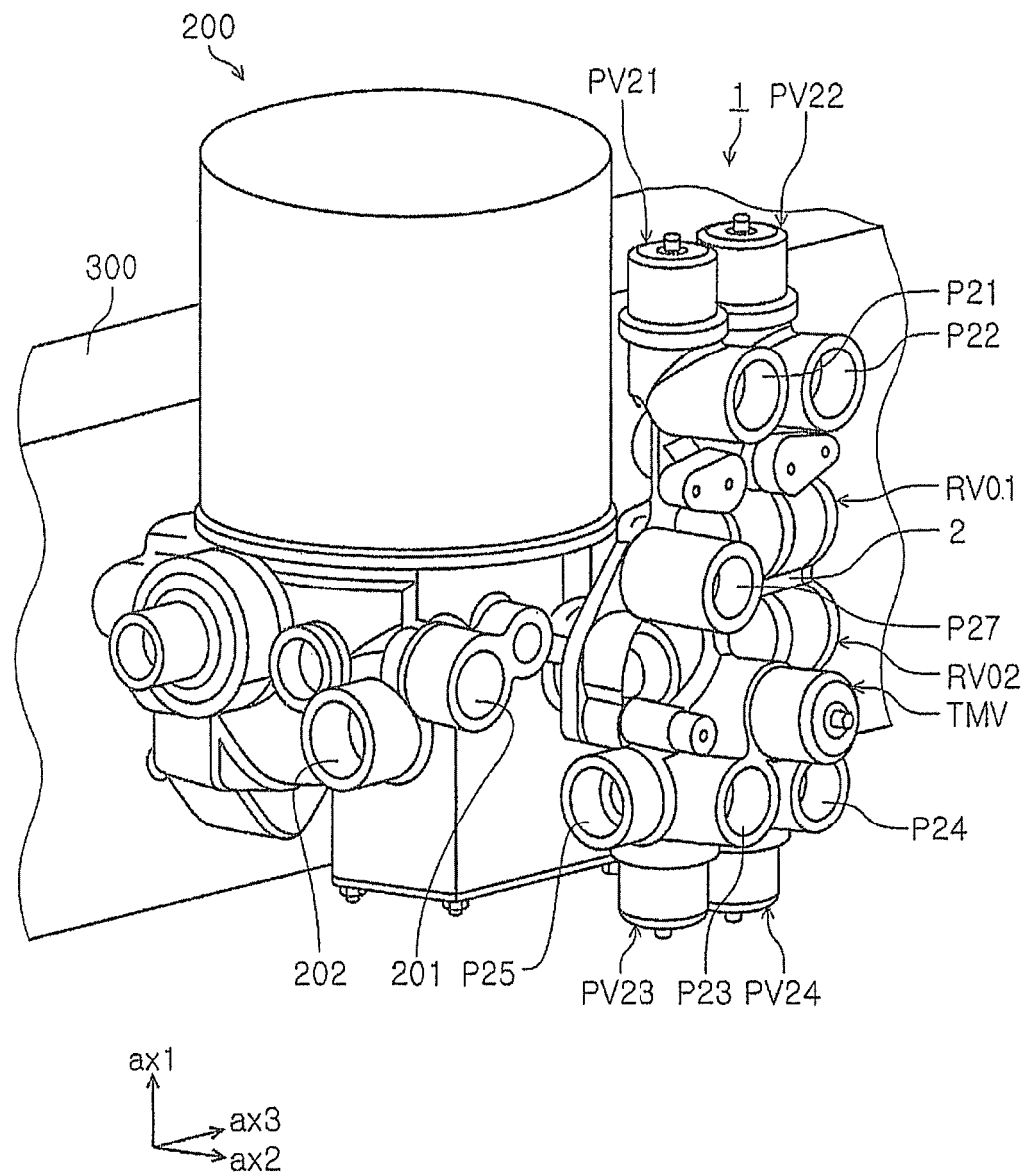
FIG. 2 is a perspective view illustrating the manner in which the protection valve according to the present invention is connected to an air drier.
Figure 3:
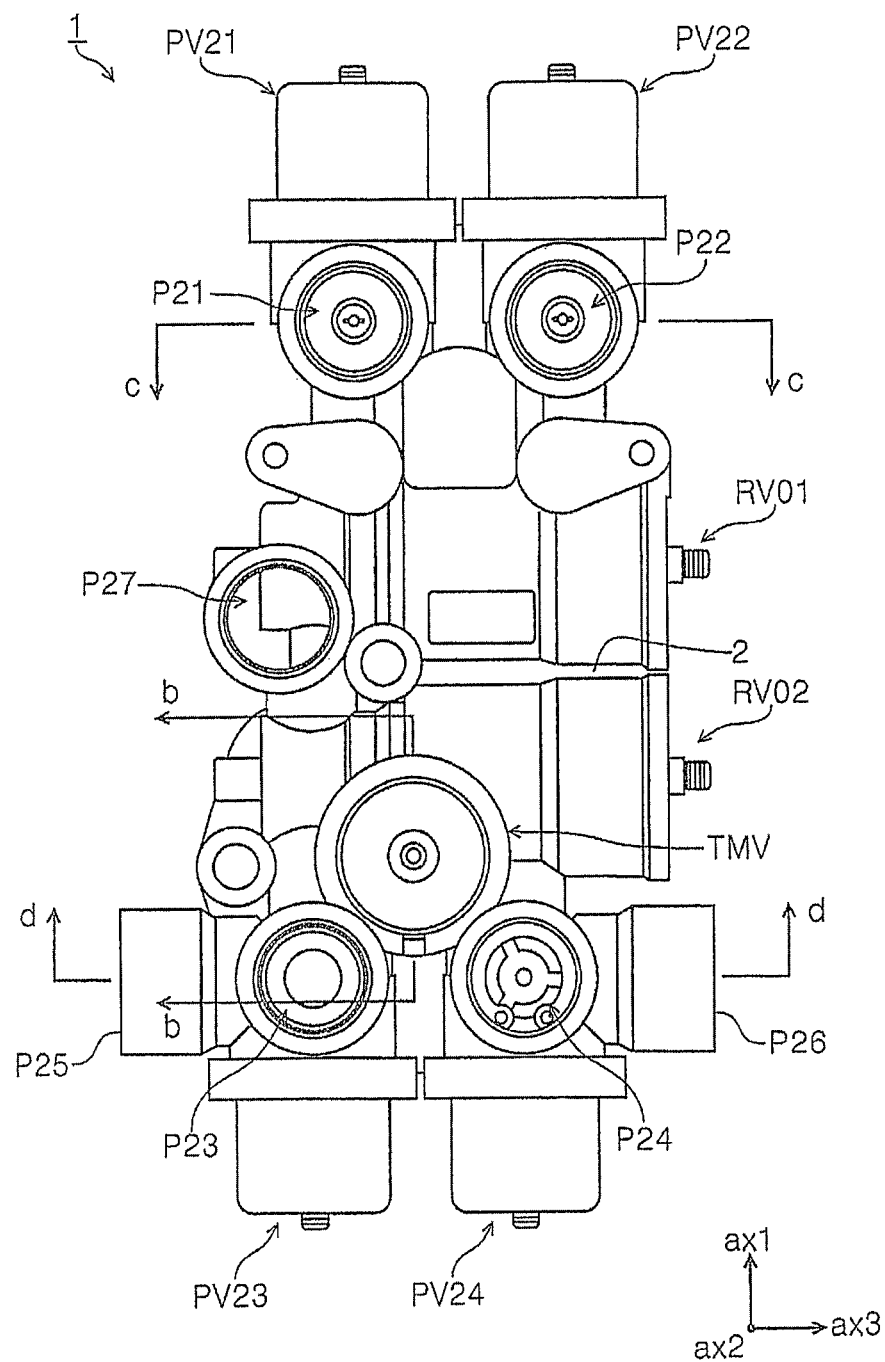
FIG. 3 is a front view of the protection valve according to the present invention.
Figure 4:
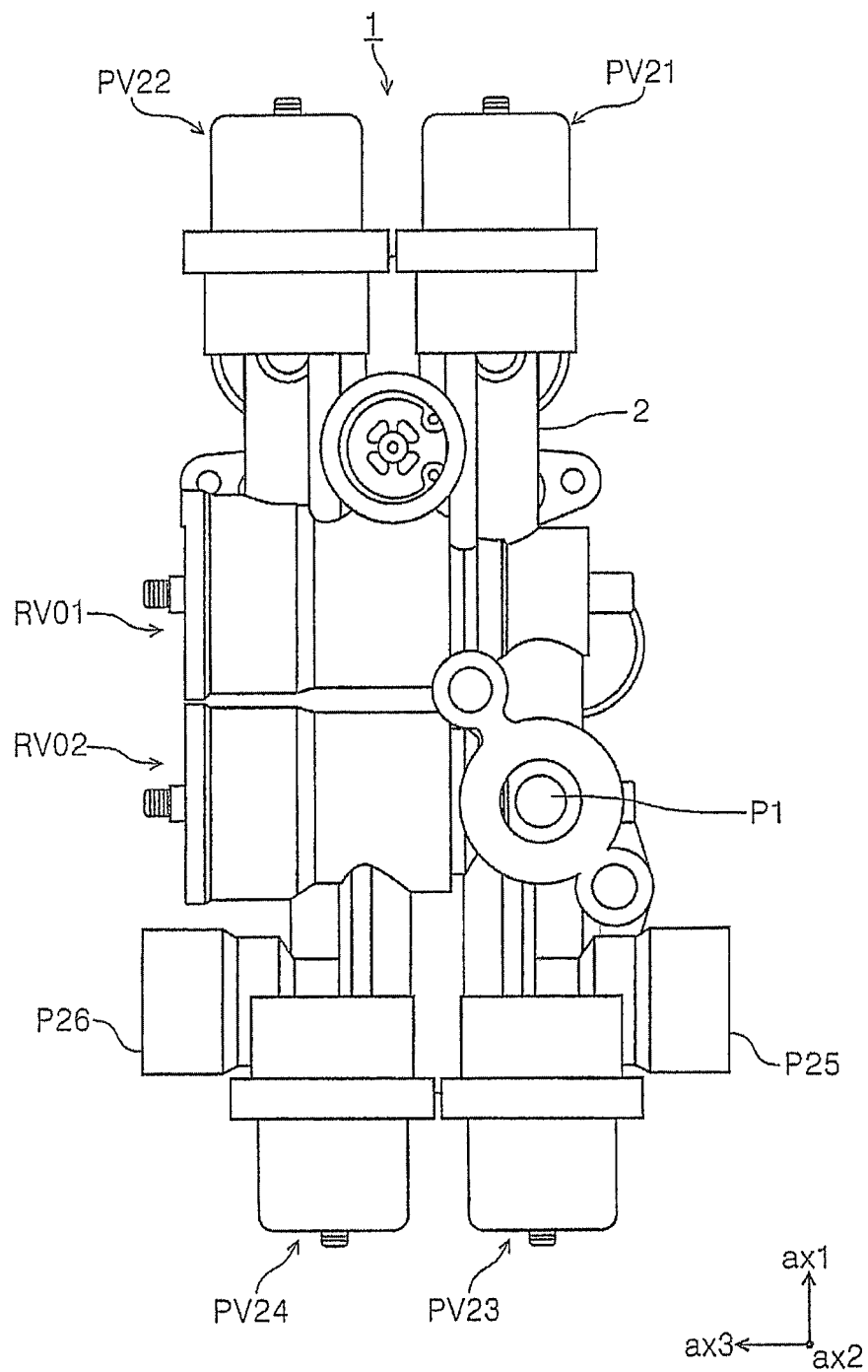
FIG. 4 is a rear view of the protection valve according to the present invention.
Figure 5:
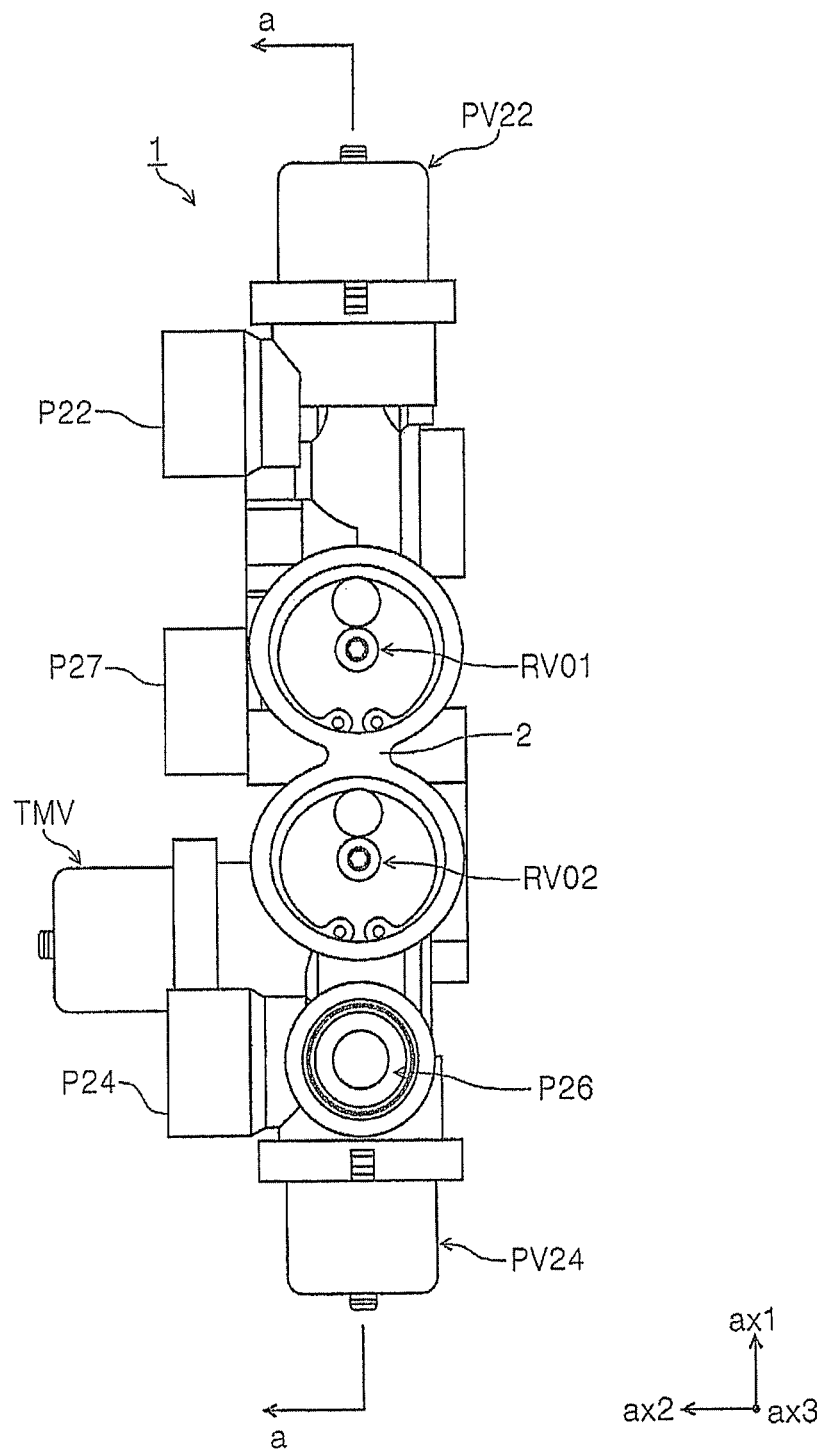
FIG. 5 is a right side view of the protection valve according to the present invention.
Figure 6:
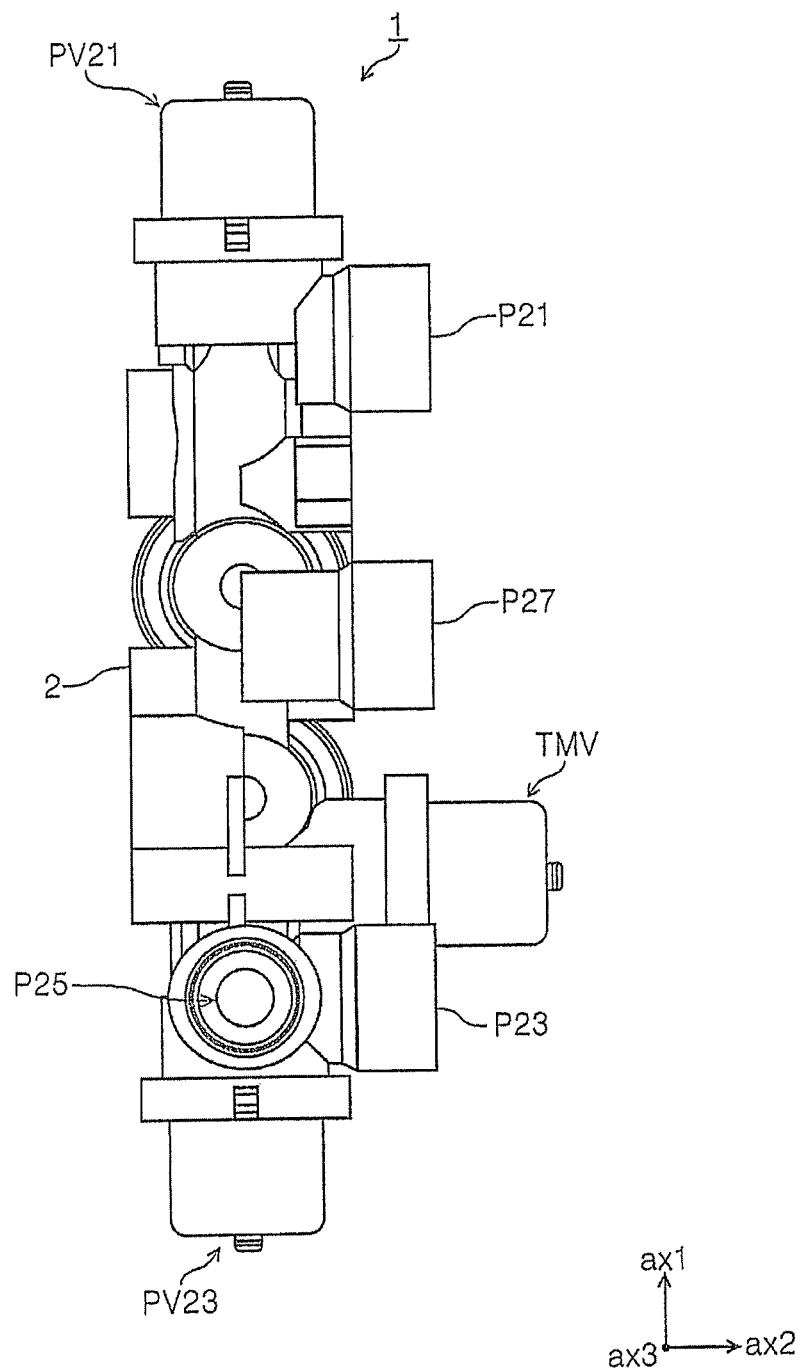
FIG. 6 is a left side view of the protection valve according to the present invention.

FIG. 1 is a circuit diagram of a protection valve 1 according to one embodiment of the present invention. FIG. 2 is a perspective view illustrating the manner in which the protection valve 1 is connected to an air drier 200. FIG. 3 is a front view of the protection valve 1. FIG. 4 is a rear view of the protection valve 1. FIG. 5 is a right side view of the protection valve 1. FIG. 6 is a left side view of the protection valve 1.

Figure 7:
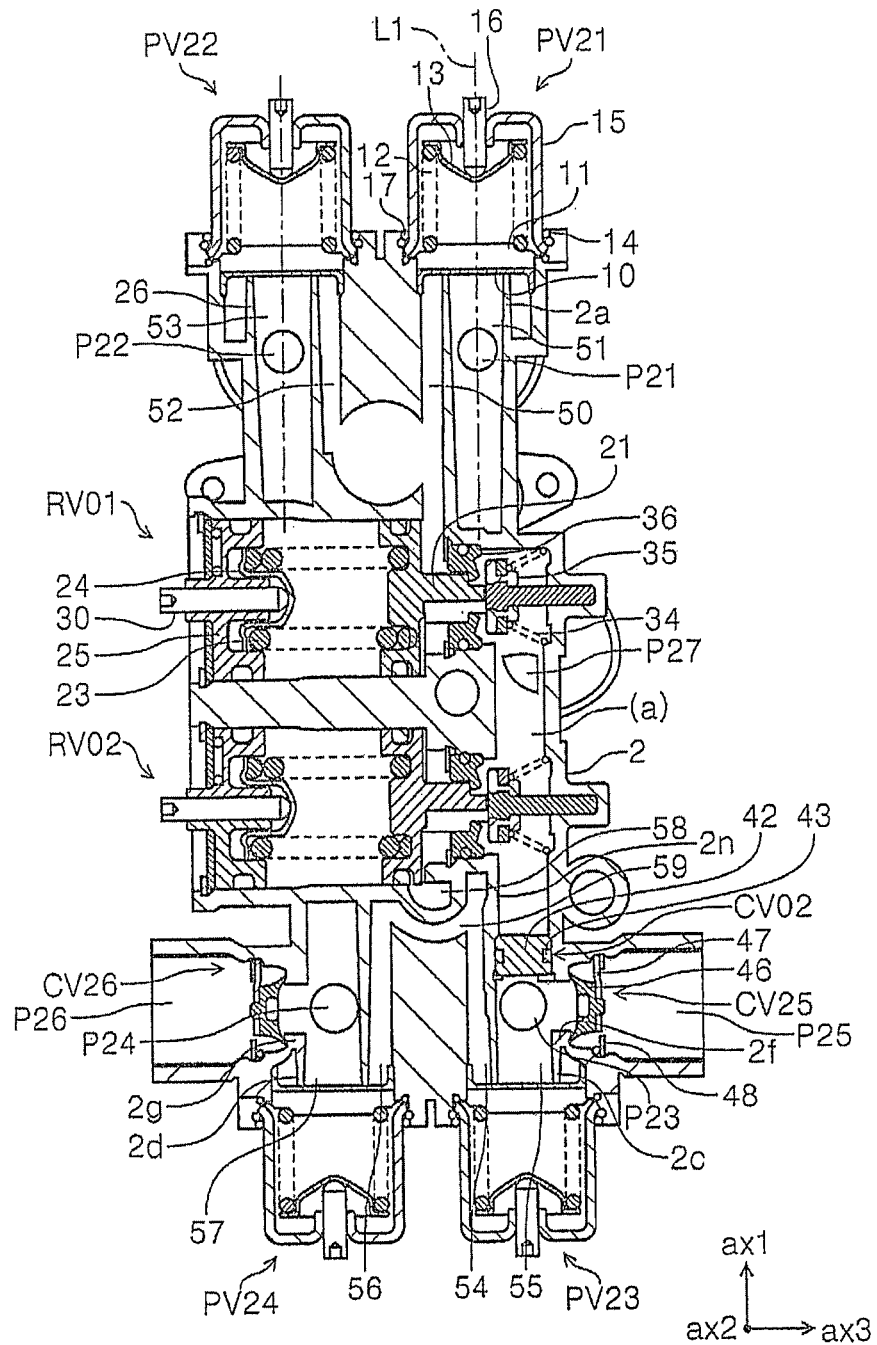
FIG. 7 is a cross-sectional view taken along the line a-a of FIG. 5.
Figure 8:
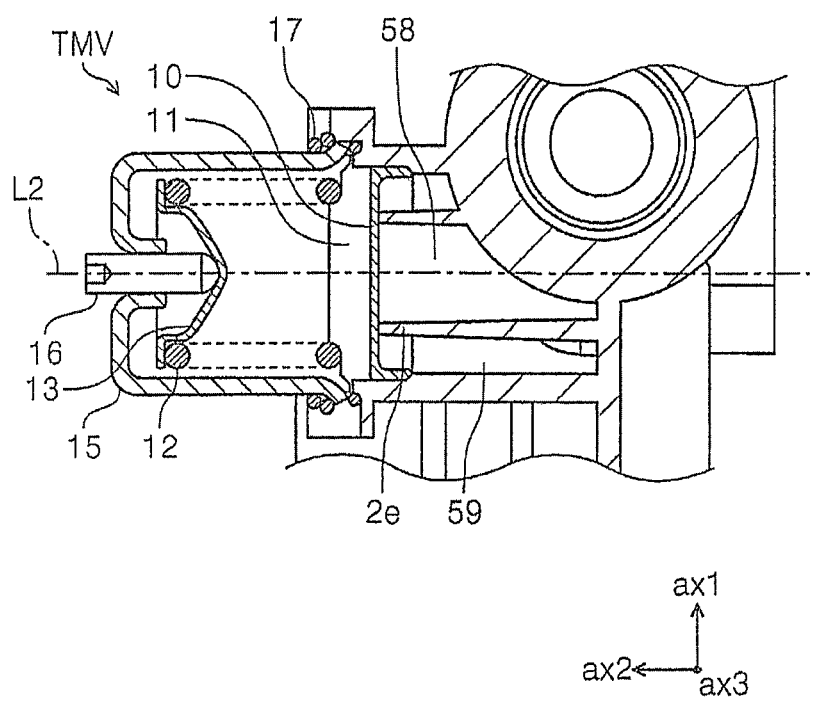
FIG. 8 is a cross-sectional view taken along the line b-b of FIG. 3.
Figure 9A:
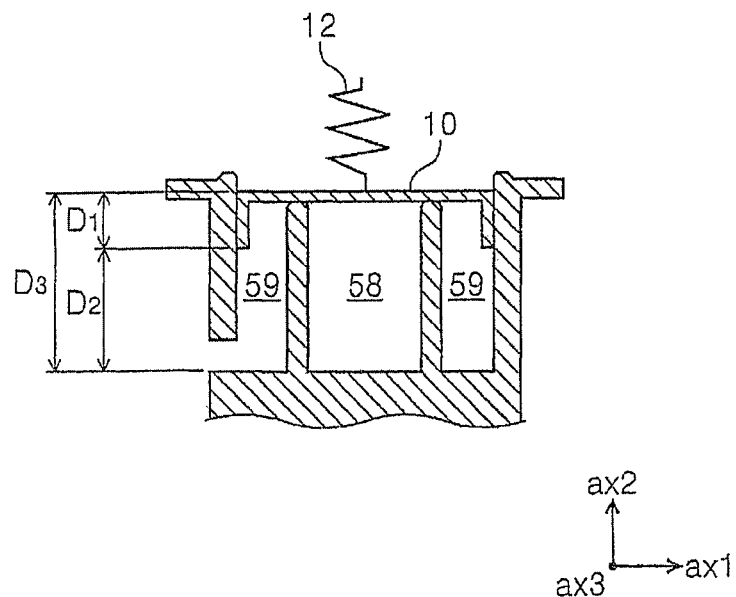
FIGS. 9(A) and (B) are schematic views of a valve structure for use in explaining the structure of a time lag-creating valve.
Figure 10:
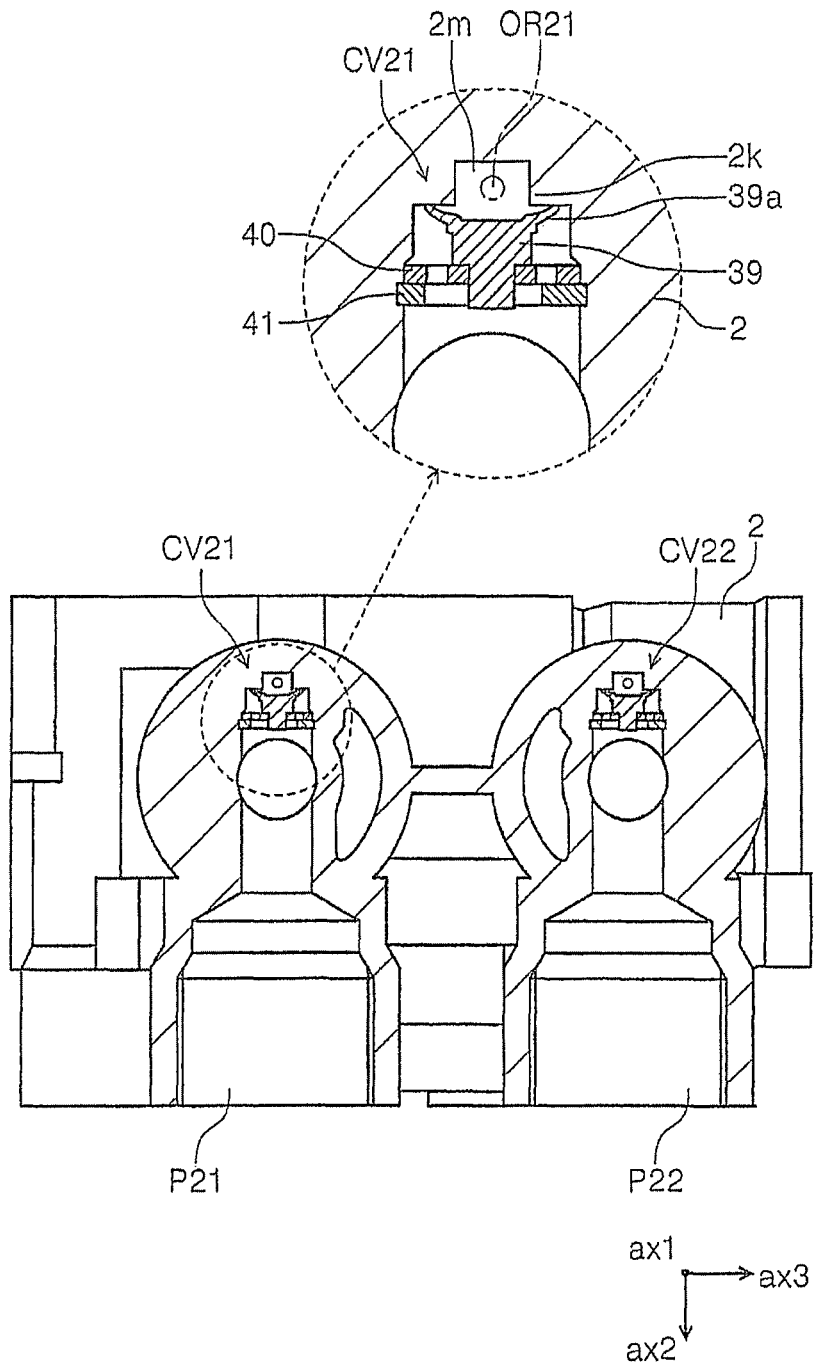
FIG. 10 is a cross-sectional view taken along the line c-c of FIG. 3.
Figure 11:
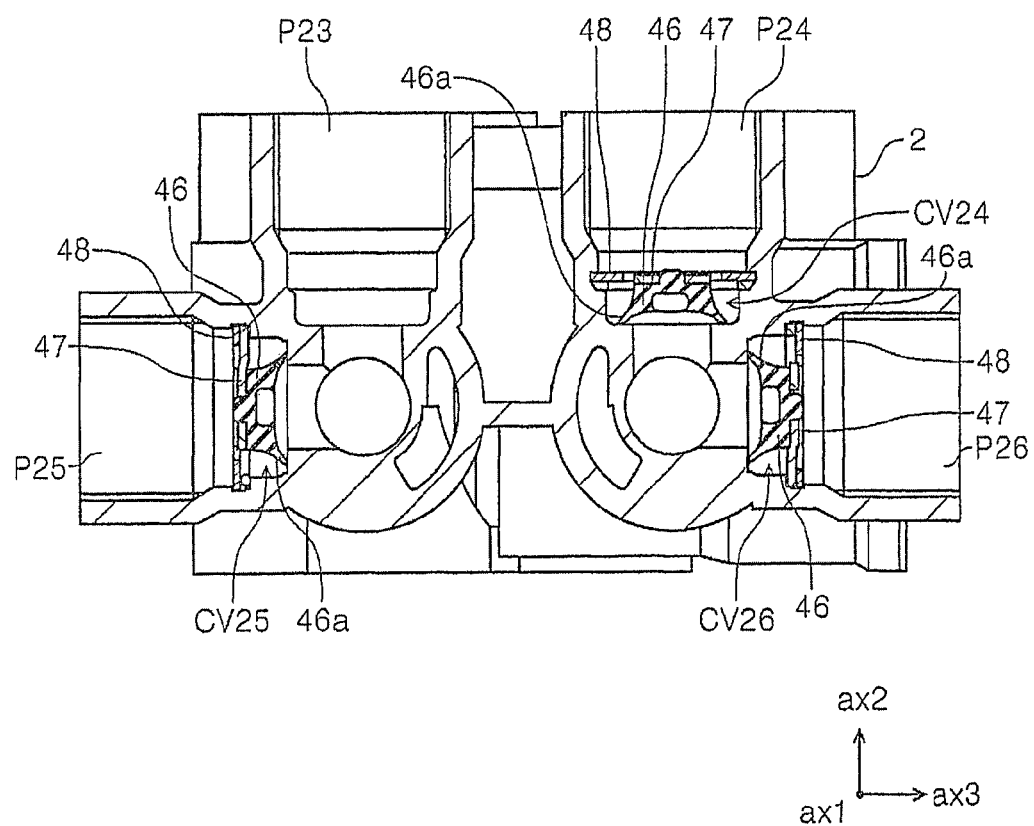
FIG. 11 is a cross-sectional view taken along the line d-d of FIG. 3.
Figure 12A:
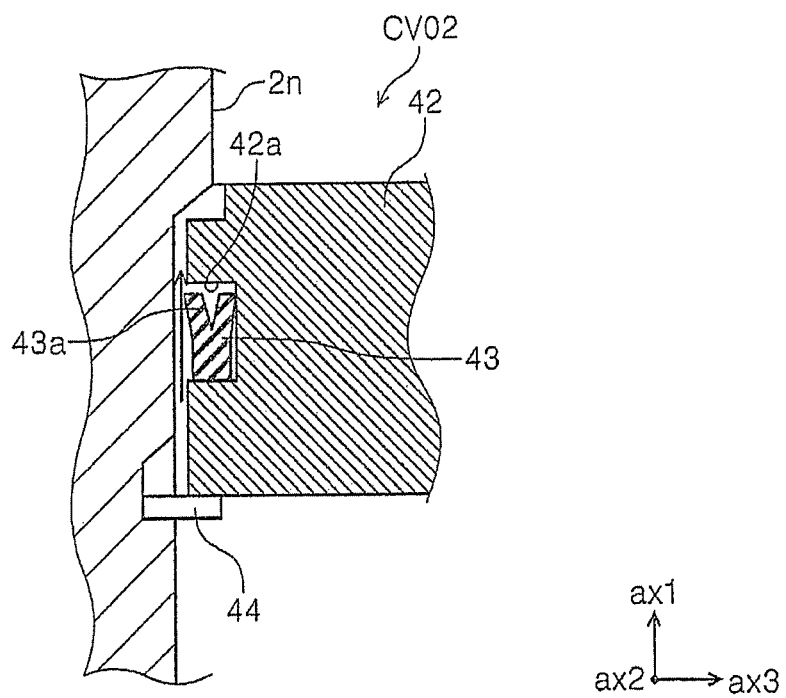
FIGS. 12(A) and (B) are cross-sectional views of a check valve (partially enlarged views of FIG. 7).
Figure 12B:
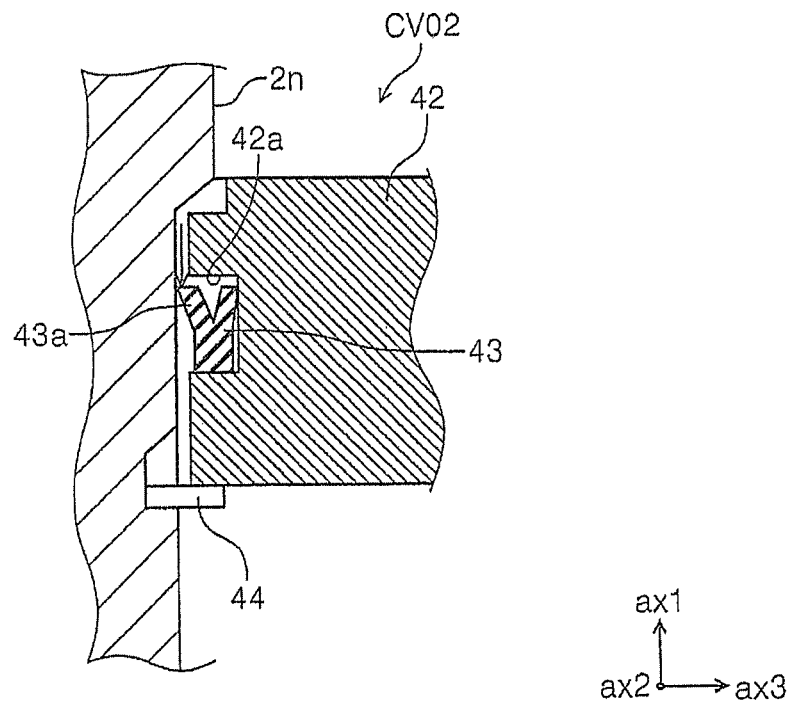
Figure 13:
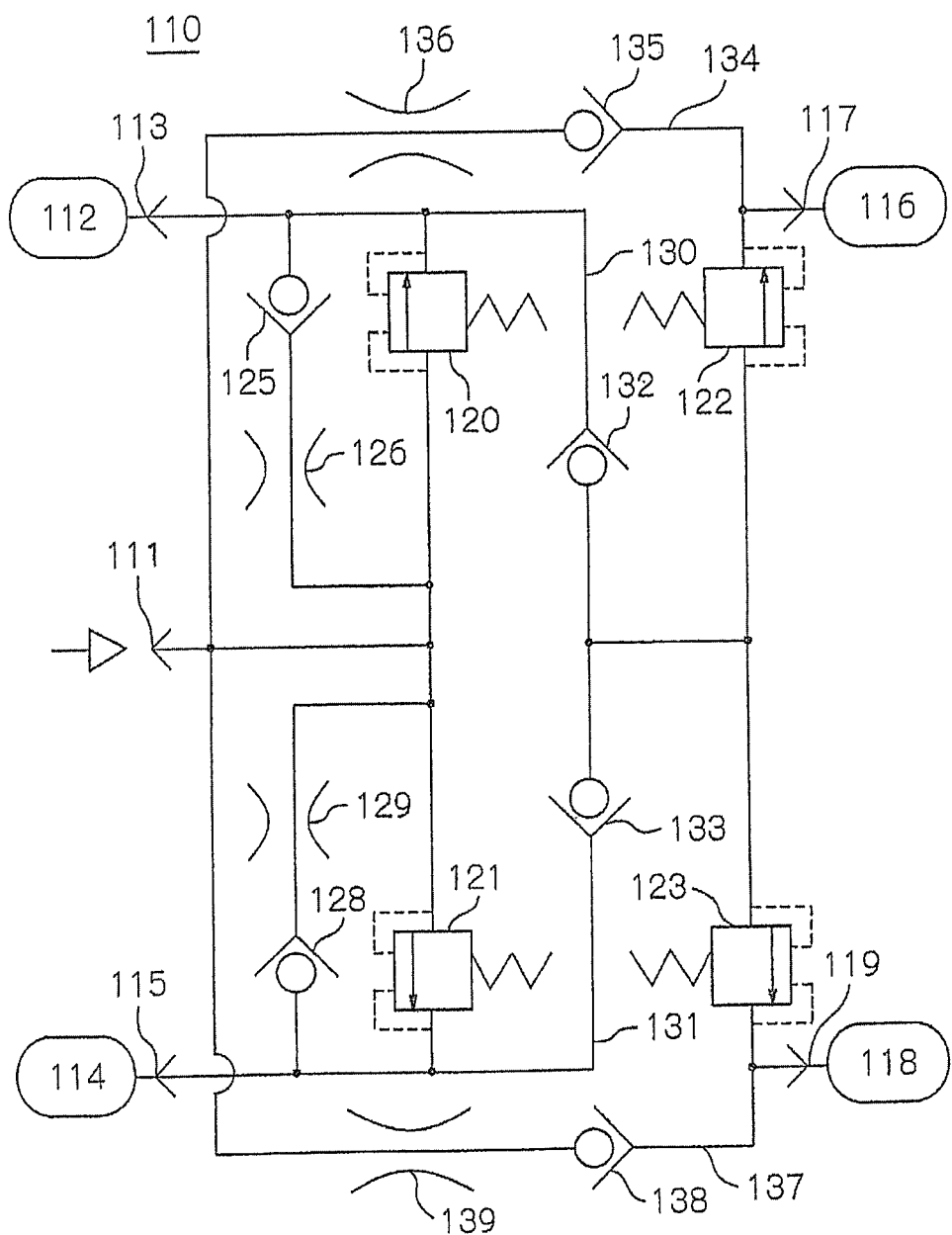
FIG. 13 is a circuit diagram of a protection valve according to a related art.

FIG. 7 is a cross-sectional view taken along the line a-a of FIG. 5. FIG. 8 is a cross-sectional view taken along the line b-b of FIG. 3. FIGS. 9(A) and (B) are explanatory views of a valve structure for explaining the structure of a time lag-creating valve TMV (this embodiment is illustrated by FIG. 9(A)). FIG. 10 is a cross-sectional view taken along the line c-c of FIG. 3. FIG. 11 is a cross-sectional view taken along the line d-d of FIG. 3. FIG. 12(A) and FIG. 12(B) are cross-sectional views of a check valve CV02 (partially enlarged views of FIG. 7).

1. Circuit Configuration of Protection Valve

The circuit configuration of the protection valve 1 is first described below with reference to FIG. 1 and FIG. 2.

The protection valve 1 is the one which generally includes one inlet port and a plurality of output ports. The protection valve is provided with, corresponding to the respective output ports, safety valves that close in response to a pressure decrease, when any of pressure circuits connected to the output ports fails and air as an example of fluid leaks therefrom.

The protection valve 1 is connected to an air drier 200 mounted on a vehicle frame 300 as shown in FIG. 2, for example. The air drier 200 takes in compressed air supplied from an air compressor (not shown) through air intake ports 201 and 202, removes impurities such as oil contained in the compressed air, and discharges the compressed air after the impurity removal through an air discharge port (not shown). It should be noted that detailed illustration and description of the constitution of the air drier 200 is not provided herein. An input port P1 as an air intake port of the protection valve 1 according to one embodiment of the present invention is connected to the air discharge port (not shown) of the air drier 200.

In FIG. 1, every "P2#" (# is an integer) designates an output port as an air discharge port of the protection valve 1, and a service brake circuit of the vehicle, for example, is connected to each of output ports P21, P22 as "first output ports." A trailer brake circuit is connected to an output port P23 as a "second output port," and an accessory circuit is connected to an output port P24 as a "third output port," for example. A parking brake circuit is connected to an output port P25, and other accessory circuits are connected to respective output ports P26, P27, P29.

The components designated by the symbol P/S connected to the ends of a branch line (t) branched at a upstream side of the output port P21 and a branch line (u) branched at a upstream side of the output port P22 are pressure sensors for detecting air pressures on a downstream side of safety valves PV21 and PV22, which are described later.

In FIG. 1, the symbols PV21, PV22, PV23, PV24 designate safety valves provided corresponding to the respective output ports P21, P22, P23, P24. Each safety valve remains closed when compressed air is not supplied to its primary side (compressed air inlet side), and opens when compressed air is supplied and the air pressure on its primary side increases.

Also, each safety valve closes when the pressure circuit connected to its corresponding output port fails and the air pressure on its secondary side (compressed air outlet side) decreases. As used herein, the term "upstream side" refers to the upstream side with respect to the direction of a compressed air flow, and the term "downstream side" refers to the downstream side with respect to the direction of a compressed air flow. Generally, the left side is the upstream side and the right side is the downstream side in FIG. 1.

In FIG. 1, the symbols RV01 and RV02 designate pressure reducing valves, and the compressed air taken in through the input port P1 is reduced in pressure by the pressure reducing valves RV01 and RV02, and then the compressed air is supplied to the downstream side.

In FIG. 1, the symbols CV02, CV21, CV22, CV24, CV25, CV26 designate check valves which permit compressed air to flow in only one direction. For example, the symbol CV21 designates a check valve which permits a flow only from left to right in FIG. 1. The symbols OR21 and OR22 designate orifice valves for throttling the flow of compressed air.

The protection valve 1 according to this embodiment includes an input chamber (a) which is located at a downstream side of the input port P1 and into which air is introduced, and the air flow path from the input chamber (a) branches into a first branch line (b) leading to the output port P21, a second branch line (c) leading to the output port P23, and a flow path (v) leading to the output port P27.

The pressure reducing valve RV01 is provided in the first branch line (b), and the flow path branches into a fifth branch line (d) and a sixth branch line (e) at a downstream side of the pressure reducing valve RV01. A safety valve PV21 as a "first safety valve" is provided in the fifth branch line (d), and a safety valve PV22 is provided in the sixth branch line (e). A flow path (s) bypassing the safety valve PV21 is provided, and an orifice valve OR21 and a check valve CV21 are provided in the flow path (s). Similarly, a flow path (r) bypassing the safety valve PV22 is provided, and an orifice valve OR22 and a check valve CV22 are provided in the flow path (r).

The pressure reducing valve RV02 is provided in the second branch line (c), and a time lag-creating valve TMV characterizing the protection valve 1 according to the present invention is provided at a downstream side of the pressure reducing valve RV02. The downstream side of the time lag-creating valve TMV branches into a third branch line (f) and a fourth branch line (g), and a safety valve PV23 as a "second safety valve" and a safety valve PV24 as a "third safety valve" are provided in the third branch line (f) and the fourth branch line (g), respectively.

The flow path at a downstream side of the safety valve PV23 further branches into flow paths (j), (h) and (k), and the flow path (j) leads to the output port P25 via the check valve CV25. The flow path (k) leads to the output port P23, and the flow path (h) further branches into a flow path (n) leading to the output port P29 and into a flow path (m) joined to a flow path (v) via the check valve CV02.

As described above, the flow path at the downstream side of the safety valve PV23 and the input chamber (a) are bypassed via the check valve CV02. For example, when the service brake circuit connected to the output port P21 fails and an air leak is caused, the air on the downstream side of the safety valve PV23 is allowed to flow out through the flow path (s) bypassing the safety valve PV21. Accordingly, an undesired situation, where the parking brake or trailer brake is released when the service brake cannot be used, can be avoided.

The operation of the protection valve 1 constituted as described above is described below. When compressed air is supplied to the input chamber (a), pressure of the compressed air is reduced by the pressure reducing valve RV01 and the compressed air is then supplied to the primary side of the safety valves PV21, PV22 on the first branch line (b) side. Then, the safety valves PV21, PV22 open in response to a pressure increase on their primary side, and the compressed air is supplied to the output ports P21, P22. Compressed air is also supplied directly to the output port P27 from the input chamber (a).

On the second branch line (c) side, pressure of the compressed air is reduced by the pressure reducing valve RV02, and the compressed air is then supplied to the primary side of the time lag-creating valve TMV. The time lag-creating valve TMV is set to have and opening pressure higher than that of the safety valves PV21, PV22. Thus, the time lag-creating valve TMV are still closed when the safety valves PV21, PV22 open, in other words, the safety valves PV23, PV24 are still closed when the safety valves PV21, PV22 open.

Then, when the pressure reaches the opening pressure of the time lag-creating valve TMV with a time lag, the time lag-creating valve TMV opens and compressed air starts to be supplied to the primary side of the safety valves PV23, PV24 is started. Then, the pressure reaches the opening pressure of the safety valves PV23, PV24, the safety valves PV23, PV24 open and compressed air is supplied to the output ports P23-26 and P29.

As described above, according to the protection valve 1 of the present invention, regularity of valve opening sequence, for the safety valve PV21 as a "first safety valve" and the safety valve PV23 as a "second safety valve" is realized not by connecting the safety valve PV21 and the safety valve PV23 in series. It is realized by arranging the safety valve PV21 and the safety valve PV23 in parallel and installing the time lag-creating valve TMV having an opening pressure which is higher than that of the safety valve PV21 on the upstream side of the safety valve PV23. Therefore, constitution inside the valve body of the protection valve 1 is prevented from becoming complicated. Also, the only thing to do about the time lag-creating valve TMV is to control the opening pressure strictly. Therefore, a higher degree of freedom for design of the valve body can be obtained compared to a protection valve having a circuit configuration in which the safety valves PV21 and PV23 are connected in series.

2. Structure of Protection Valve Body

The valve body structure of the protection valve 1 that provides the above circuit configuration is described in more detail with further reference to FIG. 3 and the subsequent drawings. In FIG. 2 to FIG. 12, the symbol ax1 designates a first axis, the symbol ax2 designates a second axis (axis orthogonal to the axis ax1), and the symbol ax3 designates a third axis (axis orthogonal to the axes ax1 and ax2). In the following, the valve body structure is explained by using an [ax1]-[ax2]-[ax3] three-dimensional coordinate system. The axis ax1 is defined as a vertical axis parallel to the direction of gravitational force for convenience sake and the axes ax2 and ax3 form a horizontal plane orthogonal to the direction of gravitational force in FIG. 2 to FIG. 12. However, it goes without saying that this is merely an example and the shape of the protection valve 1 according to the present invention and its installation position on the air drier 200 are not limited to those shown in FIG. 2 to FIG. 12.

The protection valve 1 includes a valve body 2 as a base having a generally rectangular parallelepiped structure with a reduced thickness in one direction. Specifically, a thickness of the protection valve 1 is reduced in the direction of the axis ax2 and the protection valve 1 is elongated in the direction of the axis ax1.

It is obvious from comparison with the circuit diagram in FIG. 1 that the pressure reducing valve RV01 and the flow paths, various valves, and output ports, on the downstream side of the pressure reducing valve RV01, are located in the upper half, and the pressure reducing valve RV02 and the flow paths, various valves, and output ports, on the downstream side of the pressure reducing valve RV02 are located in the lower half in much the same way as in FIG. 1.

The input port P1 as an inlet for compressed air is formed in the rear face of the valve body 2 (FIG. 4), and other output ports are all formed in the front face (FIG. 3) or side faces (FIG. 5, FIG. 6) of the valve body 2. In this embodiment, because the output port P27 is communicated directly with the input port P1, the output port P27 may be used instead of the input port P1 with the input port P1 closed. In this case, no port is present in the rear face of the valve body 2, and the input and output ports are all formed in the front face (FIG. 3) or side faces (FIG. 5, FIG. 6) of the valve body 2.

The structure in the valves is further explained with reference mainly to cross-sectional views in FIG. 7 to FIG. 9.

<<Structure of Safety Valves PV21, PV22, PV23, PV24>>

In the protection valve 1, the safety valves PV21, PV22, PV23, PV24 basically have the same structure and the same components (an opening pressure and a closing pressure are individually set for each valve). In general, the safety valves PV21, PV22, PV23, PV24 are movable in the direction of the first axis to open or close the communication between a primary-side space outside and a secondary-side space inside. In this embodiment, the safety valves PV21, PV22, PV23, PV24 are all adjusted such that their opening pressure is higher than their closing pressure and the difference (hysteresis) between the opening pressure and the closing pressure satisfies a specification value.

The safety valve PV21 is taken as an example to describe the structure of the safety valves. As shown in FIG. 7, the safety valve PV21 includes: a partition wall 2a formed around an axis L1 parallel to a first axis ax1, which separates a secondary side space 51 extending in the direction of the first axis ax1 from a primary side space 50 formed around the secondary side space 51; and a valve element 10 movable in the direction of the first axis ax1 from an end of the partition wall 2a which serves as a valve seat to open or close communication between the primary side space 50 and the secondary side space 51. The primary side space 50 has an annular cross-section (when cut along the plane formed by the second axis ax2 and the third axis ax3), and the secondary side space 51 has a circular cross-section.

The numeral 12 designates a main spring for biasing the valve element 10 in the closing direction, the numeral 13 designates an upper spring seat which serves as a seat for the main spring 12, and the numeral 11 designates a lower spring seat which serves as the other seat for the main spring 12. In addition, the numeral 15 designates a valve cover defining a spring housing space of the safety valve PV21, the numeral 17 designates a stopper ring for fixing the valve cover 15, and the numeral 14 designates an O-ring for providing a seal.

The numeral 16 designates a set screw. The upper spring seat 13 can be displaced by adjusting the set screw, whereby the biasing force (in other words, the opening pressure) with which the main spring 12 biases the valve seat 10 can be adjusted.

In FIG. 7, the safety valve PV22, PV23, PV24, which have the same constitution as the safety valve PV21, and their constituent elements are not designated by a numeral in order to avoid complexity of the drawing. However, the symbol 2b in the safety valve PV22, the symbol 2c in the safety valve PV23, and the symbol 2d in the safety valve PV24 designate the partition walls corresponding to the partition wall 2a of the safety valve PV21.

The primary side space 50 corresponds to the flow path (d), and the secondary side space 51 of the safety valve PV21 corresponds to the flow path at a downstream side of the safety valve PV21, in FIG. 1. Similarly, a primary side space 52 corresponds to the flow path (e), and a secondary side space 53 of the safety valve PV22 corresponds to the flow path at a downstream side of the safety valve PV22, in FIG. 1. A primary side space 54 corresponds to the flow path (f), and a secondary side space 55 of the safety valve PV23 corresponds to the flow path at a downstream side of the safety valve PV23, in FIG. 1. A primary side space 56 corresponds to the flow path (g), and a secondary side space 57 of the safety valve PV24 correspond the flow path at a downstream side of the safety valve PV24, in FIG. 1.

<<Structure of Time Lag-Creating Valve TMV>>

The structure of the time lag-creating valve TMV is next described with reference mainly to FIG. 7 and FIG. 8. While the time lag-creating valve TMV has generally the same structure as the safety valve PV21 as described above, the time lag-creating valve TMV is different from the safety valve PV21 in that the primary side space is formed inside and the secondary side space is formed outside.

More specifically, in FIG. 8, the time lag-creating valve TMV includes: a partition wall 2e, formed around an axis L2 parallel to the second axis ax2, which separates a primary side space 58 extending in the direction of the second axis ax2 from a secondary side space 59 formed around the primary side space 58; and a valve element 10 which is movable in the direction of the second axis ax2 from an end of the partition wall 2e which serves as a valve seat to open or close the communication between the primary side space 58 and the secondary side space 59. The other constitution is the same as that of the safety valve PV21 described above, and then the same components are designated by the same numerals and their description is not repeated in the following.

As for the relationship with the safety valve PV23 as a second safety valve and the safety valve PV24 as a third safety valve, the time lag-creating valve TMV is located between the safety valve PV23 and the safety valve PV24. More specifically, the safety valve PV23 and the safety valve PV24 are located at a prescribed distance from each other in the direction of the third axis ax3 as shown in FIG. 7.

The time lag-creating valve TMV is located (at an intermediate location) between the safety valve PV23 and the safety valve PV24 in the direction of the third axis ax3. In FIG. 7, the primary side space 58 and the secondary side space 59 of the time lag-creating valve TMV are shown.

Thus, as shown in FIG. 7, the secondary side space 59 of the time lag-creating valve TMV is located adjacent to and communicated with the primary side space 54 of the safety valve PV23 and the primary side space 56 of the safety valve PV24.

Thus, the time lag-creating valve TMV can be reduced in length in the direction of the second axis ax2. In other words, the protection valve 1 can be reduced in thickness. This is described in detail below.

In a valve with a structure of this kind, the primary side space is usually located outside and the secondary side space is located inside as in the case with the safety valves PV21 to PV24. This is because the opening pressure and the closing pressure of the safety valves PV21 to PV24 should be controlled strictly and the difference (hysteresis) between the opening pressure and the closing pressure should be usually small in order to meet specification requirements for a vehicle. The difference (hysteresis) between the opening pressure and the closing pressure is determined by the difference between the cross-sectional area of the "primary side space" and the cross-sectional area of the "primary side space+secondary side space." Accordingly, it is preferred to locate the primary side space outside and the secondary side space inside for the reduction of the hysteresis.

FIGS. 9(A) and (B) each schematically illustrates the structure (a part) of a time lag-creating valve TMV, and FIG. 9(A) shows this embodiment. The symbol D1 designates the depth of the valve element 10, and the symbol D2 designates the depth from the lower end of the valve element 10 to the bottoms of the primary side space 58 and the secondary side space 59. The depths D1 and D2 must be equal to or greater than a prescribed value in order to provide the valve with sufficient strength, and D1+D2=D3 must be equal to or greater than a prescribed value for design reasons.

Figure 9B:
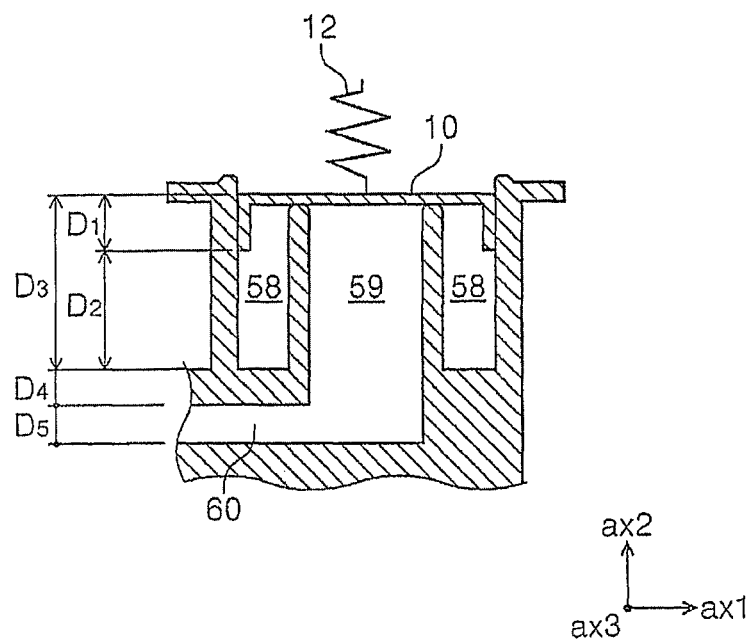

Because the time lag-creating valve TMV needs to discharge air to the left in FIG. 9 (in other words, toward the safety valves PV23, PV24), when the primary side space 58 is located outside and the secondary side space 59 is located inside in contrast to this embodiment, in other words, the primary side space 58 and the secondary side space 59 are arranged in the same manner as in an ordinary safety valve, a passage 60 bypassing the primary side space 58 must be formed below the primary side space 58 as shown in FIG. 9(B) so that air can be discharged to the left. Then, the wall thickness D4 and the passage diameter D5 must be added to the dimension D3 necessary for design reasons. As a result, a dimension in the direction of the second axis 2 is increased. In other words, the thickness of the entire protection valve 1 is increased.

In this embodiment, however, the primary side space 58 is located inside and the secondary side space 59 is located outside in contrast to an ordinary safety valve as shown in FIG. 9(A). Therefore, air can be directly discharged to the left in FIG. 9 (in other words, toward the safety valves PV23, PV24) and the increase in size in the direction of the second axis ax2 as shown in FIG. 9(B) can be prevented. The only thing to do about the time lag-creating valve TMV is to control the opening pressure, and the time lag-creating valve TMV may have a large hysteresis. Therefore, an increase in hysteresis, caused by placing the primary side space 58 inside and the secondary side space 59 outside, worsens the functions that the time lag-creating valve TMV is required to fulfill.

<<Structure of Pressure Reducing Valves RV01 and RV02>>

Referring again to FIG. 7, the pressure reducing valves RV01 and RV02 are next described. Because the pressure reducing valves RV01 and RV02 basically have the same structure and the same components, only the constituent elements of the pressure reducing valve RV01 are designated by numerals in order to avoid complexity of the drawing.

The pressure reducing valve RV01 is taken as an example to describe the structure of the pressure reducing valves RV01 and RV02. The numeral 35 designates a valve element movable in the direction of the third axis ax3 into contact with and away from a valve seat 36 to open or close the pressure reducing valve RV01, and the valve element 35 is biased in the closing direction (to the left in FIG. 7) by a return spring 34. The biasing force of the return spring 34 is much smaller than that of a valve spring 23, which is described later, and hardly contributes to the settings of the opening and closing pressures of the pressure reducing valve RV01.

A tip of a valve stem 21 movable in the direction of the third axis ax3 is in contact with the valve element 35, and the valve stem 21 receives the biasing force of the valve spring 23 and biases the valve element 35 in the opening direction (to the right in FIG. 7).

One end of the valve spring 23 is in contact with the valve stem 21 and the other end of the valve spring 23 is in contact with a spring seat 24. The position of the spring seat 24 is adjustable by a set screw 30, making the closing pressure of the pressure reducing valve RV01, in other words, the pressure drop necessary to close the pressure reducing valve RV01, adjustable. The numeral 25 designates a spring cover, and the spring cover 25 has an orifice (not shown) which allows air communication between the housing space for the valve spring 23 and the outside so that the housing space for the valve spring 23 can be expanded or contracted. A filter (not shown) is disposed in the orifice so that water cannot enter the housing space from outside through the orifice.

The pressure reducing valve RV01 with the above constitution is normally open, and remains open as shown in FIG. 7 until the pressure on the primary side reaches a prescribed value. When pressure on the primary side reaches a prescribed value, the biasing force of the valve spring 23 biasing the valve stem 21 yields to the air pressure and the valve stem 21 retracts. As a result, the valve element 35 is brought into contact with the valve seat 36 and the pressure reducing valve RV01 closes. The above is the description of the constitution and operation of the pressure reducing valves RV01 and RV02.

<<Structure of Check Valves CV21, CV22, CV24-CV26>>

The check valves CV21, CV22, CV24-CV26 are next described with reference to FIG. 10 and FIG. 11.

Because the check valves CV21, CV22 shown in FIG. 10 basically have the same structure and same components, the check valve CV21 is taken as an example for description below.

As shown in the enlarged illustration (encircled by a dotted line) of the check valve CV21 in FIG. 10, the valve body 2 has a fine pore (OR21) which serves as the orifice OR21. The orifice OR21 is formed on the near side in the plane of FIG. 10, and compressed air flows into a space 2m formed in the valve body 2 through the orifice OR21.

The valve body 2 has a valve seat 2k, and a tip 39a of a valve element 39 is in contact with the valve seat 2k. The valve element 39 is made of an elastically deformable material (such as rubber), and the check valve CV21 opens when the tip 39a is elastically deformed, allowing compressed air to flow only downstream. The numeral 40 designates a stopper plate for supporting the valve element 39, and the numeral 41 designates a stopper ring for fixing a stopper plate 40. Both the stopper plate 40 and the stopper ring 41 have an opening through which compressed air flows.

The check valves CV24, CV25, CV26 shown in FIG. 11 basically have the same constitution as the check valves CV21, CV22 described above. For example, the check valve CV24 has a valve element 46 made of an elastically deformable material, and the check valve CV24 opens when a tip 46a of the valve element 46 is elastically deformed, allowing compressed air to flow only downstream. The numeral 47 designates a stopper plate for supporting the valve element 46, and the numeral 48 designates a stopper ring for fixing a stopper plate 47. Both the stopper plate 47 and the stopper ring 48 have an opening through which compressed air flows. The check valves CV25, CV26 have generally the same constitution as the check valve CV24.

Figure 14:
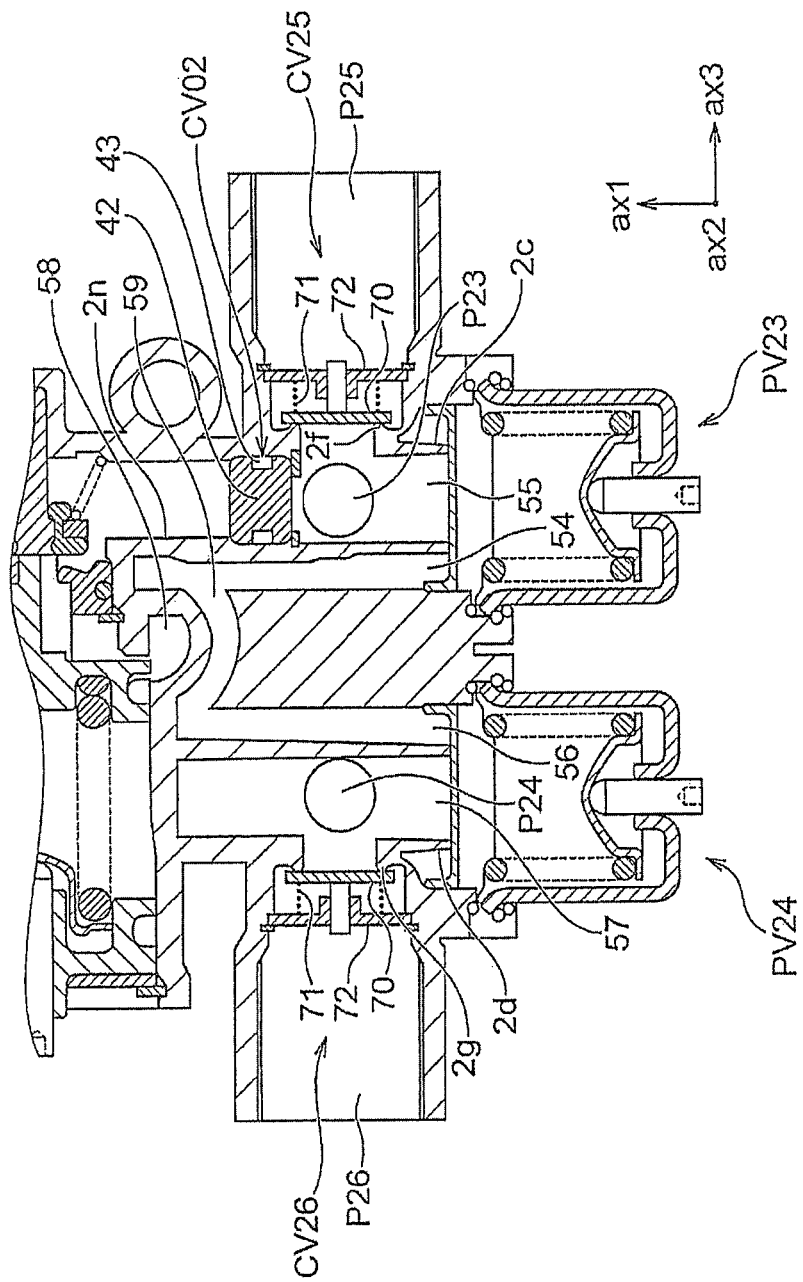
FIG. 14 is a cross-sectional view of an essential part illustrating an example of the constitution of check valves CV24, CV25, CV26 having a different constitution from that shown in FIG. 7 and FIG. 11.

FIG. 14 illustrates an example of the constitution of check valves CV24, CV25, CV26 which have a different constitution from the ones shown in FIG. 7 and FIG. 11. In FIG. 14, the valve element 46 made of an elastically deformable material in FIG. 7 and FIG. 11 is replaced by the combination of a valve element 70 and a spring 71, which press the valve element 70 toward a valve seat 2f (toward CV25) or 2g (toward CV26). In addition to this replacement, the port height (axial length) of the output ports P24, P25, P26 is greater than the port height of the output port P24, P25, P26 shown in FIG. 7 and FIG. 11. The numeral 72 designates a spring receiver for the spring 71.

The constitution shown in FIG. 14 is also applicable to the other check valves CV21, CV22. In addition, the port height (axial length) of the output port P23 may be greater than that of the output port P23 shown in FIG. 6, for example.

<<Structure of Check Valve CV02>>

The check valve CV02 is next described with reference to FIG. 12(A) and FIG. 12(B).

FIG. 12(A) and FIG. 12(B) are partially enlarged views illustrating the check valve CV02 shown in FIG. 7 schematically so that the constitution and function of the check valve CV02 can be easily understood. As illustrated, the check valve CV02 includes a coupling ring 43, a coupling stopper 42 to which the coupling ring 43 is attached, and a stopper 44 for fixing the coupling stopper 42.

A prescribed clearance is formed between the coupling stopper 42 and an inner peripheral surface 2n defining the space forming the input chamber (a) as illustrated so that air can flow therebetween. A recess 42a is circumferentially formed in an outer periphery of the coupling stopper 42, and the coupling ring 43 is received in the recess 42a.

The coupling ring 43 is made of an elastic material and has a ring-like shape. The coupling ring 43 is bifurcated as shown in the cross-sectional view of FIG. 12(A) so that one end 43a can come into contact with and separate from the inner peripheral surface 2n when elastically deformed.

Thus, when air is directed from bottom to top in FIG. 12, the end 43a is separated from the inner peripheral surface 2n as shown in FIG. 12(A), allowing air to flow from bottom to top in FIG. 12. In contrast, when air is directed from bottom to top in FIG. 12, the coupling ring 43 is expanded by the air pressure and the end 43a of the coupling ring 43 is brought into contact with the inner peripheral surface 2n to prevent air from flowing from bottom to top in FIG. 12. In this way, the check valve CV02 can fulfill its function as a check valve with a simple structure, compact size, and low cost.

FIG. 15 illustrates an example of the constitution of a check valve CV024 having a different constitution from that shown in FIG. 7 and FIG. 12. In FIG. 15, the combination of the coupling stopper 42 and the coupling ring 43 in FIG. 7 and FIG. 12 is replaced by the combination of a valve element holder 80 and a valve element 81 made of an elastic material. The valve element holder 80 is fixedly inserted into the inner peripheral surface 2n of the partition wall 2c. In FIG. 15, the numeral 83 designates an O-ring for sealing. The valve element 81 is pressed against a valve seat 82 of the valve element holder 80 by a stopper plate 47 and a stopper ring 48.

Figure 15A:
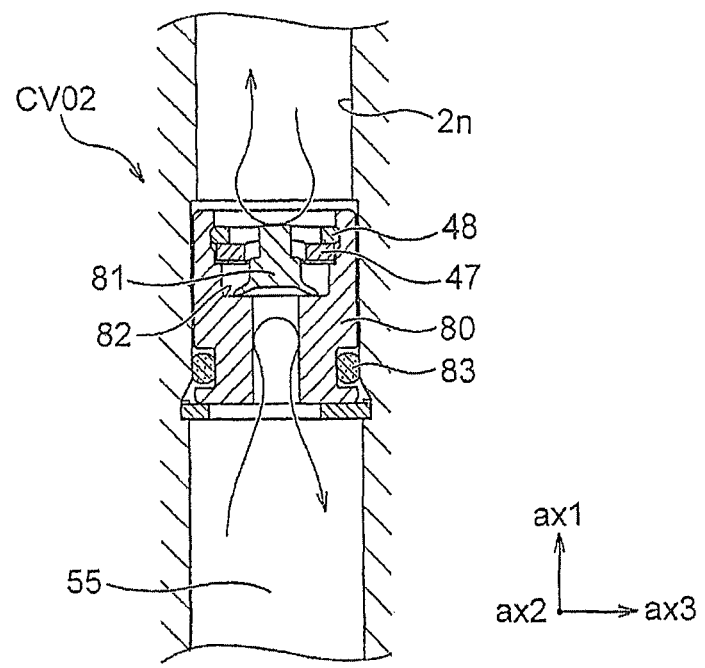
FIG. 15 is a cross-sectional view of an essential part illustrating an example of the constitution of a check valve CV02 having a different constitution from that shown in FIG. 7 and FIG. 11, in which (A) illustrates a normal state, in which the primary circuit side has a high pressure, and (B) illustrates a state where the pressure on the primary circuit side has dropped to an atmospheric level because of a failure on the primary circuit side.
Figure 15B:
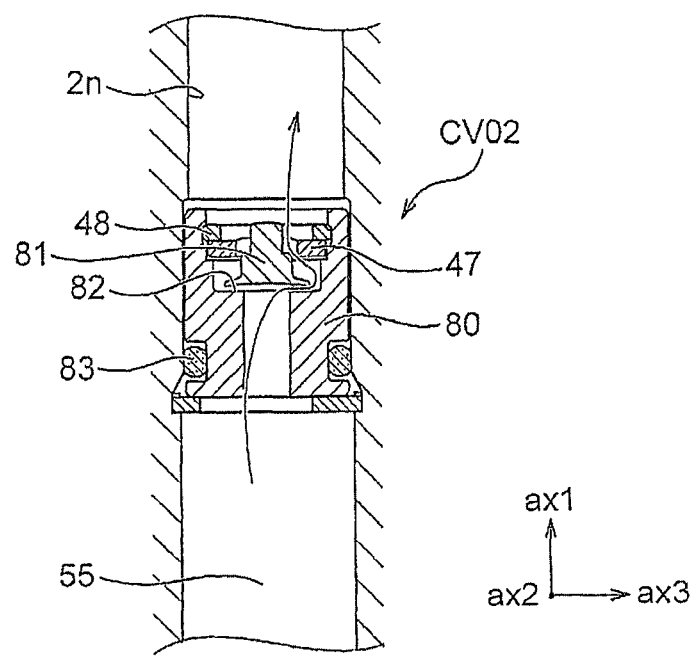

FIG. 15(A) illustrates a normal state, in which the primary circuit side has a high pressure, and FIG. 15(B) illustrates a state where the valve element 81 is separated from the valve seat 82 because there was a failure on the primary circuit side the pressure on the primary circuit side dropped to an atmospheric level.

The structure of the protection valve 1 including the time lag-creating valve TMV as described above is merely an example, and any structure may be adopted as long as it realizes the circuit configuration shown in FIG. 1, in particular, a circuit configuration in which the safety valve PV21 and the safety valve PV23 are connected in parallel and the time lag-creating valve TMV having an opening pressure higher than that of the safety valve PV21 is provided at a upstream side of the safety valve PV23, is realized. However, when constituted as in this embodiment for example, the protection valve 1 can be reduced in thickness.

The invention claimed is:

1. A protection valve, comprising:
an input chamber into which air is introduced;
a plurality of output ports through which air is discharged; and
safety valves which open in response to a pressure increase on a primary side or close in response to a pressure decrease on a secondary side, the safety valves including a first safety valve provided corresponding to a first output port in the plurality of output ports and a second safety valve provided corresponding to a second output port in the plurality of output ports;
wherein an air flow path from the input chamber is branched at least into a first branch line leading to the first output port and into a second branch line leading to the second output port, and
wherein a time lag-creating valve having an opening pressure higher than an opening pressure of the first safety valve is provided at a upstream side of the second safety valve in the second branch line, so that the second safety valve can open with a time lag after the first safety valve opens, regardless of a difference between the opening pressure of the first safety valve and the opening pressure of the second safety valve.

2. The protection valve according to claim 1,
wherein the second branch line is branched at least into a third branch line leading to the second output port and into a fourth branch line leading to a third output port in the plurality of output ports at the upstream side of the second safety valve,
wherein a third safety valve which opens in response to a pressure increase on the primary side and closes in response to a pressure decrease on the secondary side is provided corresponding to the third output port in the fourth branch line,
wherein in the valve body of the protection valve, each of the second safety valve and the third safety valve includes: a partition wall which is formed around an axis parallel to a first axis of an orthogonal coordinate system having first, second, and third axes and which separates a secondary side space extending in the direction of the first axis from a primary side space formed around the secondary side space; and a valve element movable in the direction of the first axis from an end of the partition wall which serves as a valve seat to open or close communication between the primary side space and the secondary side space,
wherein the time lag-creating valve includes: a partition wall which is formed around an axis parallel to the second axis and which separates a primary side space extending in the direction of the second axis from a secondary side space formed around the primary side space; and a valve element movable in the direction of the second axis from and end of the partition wall which serves as a valve seat to open or close the communication between the primary side space and the secondary side space,
wherein the second safety valve and the third safety valve are located at a prescribed distance from each other in the direction of the third axis, and
wherein the time lag-creating valve is located between the second safety valve and the third safety valve in the direction of the third axis so that the secondary side space of the time lag-creating valve can be located adjacent to and communicated with the primary side spaces of the second safety valve and the third safety valve.

* * * * *